US012700807B2

(12) United States Patent
    Lozowski

(10) Patent No.:   US 12,700,807 B2
(45) Date of Patent:      Aug. 4, 2026

(54) SYSTEM AND METHOD FOR A BI-DIRECTIONAL DC/DC CONVERTER

(71) Applicant: BITRODE CORPORATION, St. Louis, MO (US)

(72) Inventor: Andy Lozowski, Edwardsville, IL (US)

(73) Assignee: Bitrode Corporation, St. Louis, MO (US)

( * ) Notice: Subject to any disclaimer, the term of this patent is extended or adjusted under 35 U.S.C. 154(b) by 402 days.

(21) Appl. No.: 18/419,355

(22) Filed: Jan. 22, 2024

(65) Prior Publication Data

US 2024/0283367 A1    Aug. 22, 2024

Related U.S. Application Data

(60) Provisional application No. 63/447,293, filed on Feb. 21, 2023.

(51) Int. Cl.
*H02M 3/335*      (2006.01)
*H02M 1/00*       (2007.01)
*H02M 3/00*       (2006.01)

(52) U.S. Cl.
CPC ..... *H02M 3/33584* (2013.01); *H02M 1/0006* (2021.05); *H02M 3/003* (2021.05)

(58) Field of Classification Search
CPC . H02M 1/0006; H02M 3/003; H02M 3/33584
See application file for complete search history.

(56) References Cited

U.S. PATENT DOCUMENTS 5,914,609 A  *  6/1999  Curry ................... G01R 31/005
                                         324/601
7,433,207 B2   10/2008  Thor et al.
               (Continued)

FOREIGN PATENT DOCUMENTS

WO    WO 2023-283260      1/2023

OTHER PUBLICATIONS

PCT International Search Report for International Application PCT/US2024/012521, search report date of mailing May 20, 2024 (May 20, 2024).

*Primary Examiner* — Gary A Nash
(74) *Attorney, Agent, or Firm* — Daniel W. Roberts; Law Offices of Daniel W. Roberts, LLC

(57)          ABSTRACT

Provided is a system and method for a bi-directional DC/DC converter. More specifically, provided is a bi-directional DC/DC converter, having a balancing effect of two bi-directional input points and two bi-directional output points to three distinct pairs of MOSFET circuits disposed between the input points and the output points. The balancing effect is provided by a copper backplane having a first side and a second side, the first side providing first power terminals and second power terminals through the backplane the second side providing electrical traces disposing two pairs of MOS-FETS each at a first proximity to either of the first power terminals or the second power terminals with a first effective resistance and the third pair of MOSFETS at a second proximity between the first power terminals and the second power terminals with a second effective resistance, wherein the first effective resistance is substantially the same as the second effective resistance. An associated method of use is also provided.

41 Claims, 12 Drawing Sheets

(56) References Cited

U.S. PATENT DOCUMENTS

| | | | |
|---|---|---|---|
| 7,456,602 B2 * | 11/2008 | Hampo | B60L 58/20 |
| | | | 318/105 |
| 7,638,900 B2 | 12/2009 | Asuke et al. | |
| 8,929,099 B2 | 1/2015 | Kepley et al. | |
| 9,711,962 B2 * | 7/2017 | Andrea | H02H 9/002 |
| 9,809,119 B2 | 11/2017 | She et al. | |
| 9,876,434 B2 | 1/2018 | Torrico-Bascope et al. | |
| 10,574,084 B2 | 2/2020 | Ghosh et al. | |
| 2010/0007293 A1 * | 1/2010 | Meadors | B60L 53/20 |
| | | | 320/140 |
| 2012/0001342 A1 | 1/2012 | Sato et al. | |
| 2012/0074949 A1 * | 3/2012 | Kepley | H02M 3/33584 |
| | | | 324/426 |
| 2017/0200705 A1 | 7/2017 | Zhang et al. | |
| 2022/0103088 A1 | 3/2022 | Slepchenkov et al. | |

* cited by examiner

SYSTEM AND METHOD FOR A BI-DIRECTIONAL DC/DC CONVERTER

CROSS REFERENCE TO RELATED APPLICATIONS

This application claims the benefit under 35 U.S.C. § 119(e) of U.S. Provisional Application No. 63/447,293 filed Feb. 21, 2023 and entitled SYSTEM AND METHOD FOR A BI-DIRECTIONAL DC/DC CONVERTER, the disclosure of which is incorporated herein by reference.

FIELD OF THE INVENTION

The present invention relates generally to systems and methods for testing and charging rechargeable batteries with a DC/DC converter.

BACKGROUND

Improvements in rechargeable battery capacity, size and reduction in fabrication costs are new developments. With these developments has come a rapid expansion of uses for rechargeable batteries, not the least of which includes their application in transportation vehicles, such as but not limited to cars, trucks, bikes, scooters, aircraft and the like.

A battery charger allows power to be stored in loads, such as batteries by applying electrical current during charging cycles. During charging of a large amperage rechargeable battery such as those for vehicles, electrical current is typically drawn from a three-phase alternating current (AC) power supply, converted to direct current (DC) and supplied to the load/battery at varying current intensity and duration. The varying current and duration are typically dictated by the type of rechargeable battery being charged.

It is also not uncommon for some batteries to be conditioned with periods of rapid charging and discharging. Further, rechargeable batteries as those typically used in battery operated vehicles are large and must be charged quickly as delays in reaching destinations quickly diminish the perceived value of using electric vehicles over traditional internal combustion engine driven vehicles.

In addition, such batteries are typically low voltage and high current batteries which are preferable for high power-density circuits having a small size. Vehicles are mobile, and as such for battery operated transportation to be reasonable, the battery system must be large enough to effectively power the vehicle for a reasonable time and/or distance, but small enough so as not to be adversely heavy and to permit people and/or cargo to be transported. And again, these rechargeable batteries must be recharged easily and quickly at locations convenient to the transpiration routes.

Traditionally, AC power is converted to high voltage low current DC power, which for such batteries must then be converted to low voltage and high current DC power.

Ohm's Law defines resistance as a voltage to current ratio. With respect to the desirable application of low voltage and high current DC, Omh's Law drives the resistance levels towards extremely low values. Efficiency levels of 99% are easily attainable with a 1000V, 100 A rated circuit when copper resistance is negligible compared to the voltage/current ratio. However, in a 6V, 300 A scenario, the copper resistance becomes the major loss of efficiency.

Current ripple reduction by interleaving multiple identical power stages has been shown to work very well and may be more fully appreciated through the analogy of a V6 engine having much less torque ripple compared to a 4-cylinder engine. However, this only works well if and when the power stages are truly identical.

Identical operation of multiple interleaved power stages is hard to achieve in high power density-designs, in which circular arrangements of stages, like in the airplane engine, is too volume-hungry. While an in-line geometric arrangement would seem more desirable, the linear arrangement of stages causes imbalance, because one power stage is traditionally closer to the input, while another one is closer to the output. The copper resistance is the major source of such imbalance.

As a result, although low voltage and high current is very desirable and would be highly advantageous in a charging and testing system, the contemporary approaches balancing small size against higher current have resulted in systems with a maximum current of only about 250 amps, and an inability to vary the current as well as switch direction of current as rapidly as desired for highly advantageous testing, conditioning and charging.

Hence there is a need for a method and system that is capable of overcoming one or more of the above identified challenges.

SUMMARY OF THE INVENTION

Our invention solves the problems of the prior art by providing novel systems and methods for a bi-directional DC/DC converter providing very rapid control in the conversion of high voltage and low current to low voltage and high current that may be adapted for use in a small, highly efficient bi-directional digital test cycler.

In particular, and by way of example only, according to at least one embodiment, provided is a bi-directional DC/DC converter, including: a balancing effect of two bi-directional input points and two bi-directional output points to three distinct pairs of MOSFET circuits disposed between the input points and the output points, the balancing effect provided by a copper backplane having a first side and a second side, the first side providing first power terminals and second power terminals through the backplane and the second side providing electrical traces disposing two pairs of MOSFETS each at a first proximity to either of the first power terminals or the second power terminals with a first effective resistance and the third pair of MOSFETS at a second proximity between the first power terminals and the second power terminals with a second effective resistance, wherein the first effective resistance is substantially the same as the second effective resistance.

For yet another embodiment, provided is a bi-directional DC/DC converter, including: a copper backplane having a first side and a second side; a first wire connected to a first location on the first side of the backplane, and a second wire connected to a second location on the first side of the backplane, the first location and the second location acting as a first power terminal and a second power terminal through the backplane from the first to the second side; three pairs of MOSFET circuits disposed on the second side of the backplane; a first pair of MOSFET circuits disposed at a first proximity to the first power terminal to provide electrical connectivity with the first power terminal at a first effective resistance; a third pair of MOSFET circuits disposed at the same first proximity to the second power terminal to provide electrical connectivity with the second power terminal at the first effective resistance; a second pair of MOSFET circuits disposed at a second proximity between the first power terminal and the second power terminal to provide electrical connectivity with the first power terminal and the second power terminal at a second effective resistance, wherein the first effective resistance of the first proximity is substantially the same as the second effective resistance; a first conductive bar electrically coupled across a first half of the pairs of MOSFET circuits and a second conductive bar electrically coupled across a second half of the pairs of MOSFET circuits; wherein the first wire and second wire provide a high voltage and low current in or out of bi-directional DC/DC converter, the three pairs of MOSFET circuits bi-directionally converting the high voltage and low current in or out as provided by the first wire and second wire to a low voltage and high current in the first conductive bar and the second conductive bar.

And for yet another embodiment, provided is a method of testing a rechargeable battery, including: providing a bi-directional DC/DC converter including: a balancing effect of two bi-directional input points and two bi-directional output points to three distinct pairs of MOSFET circuits disposed between the input points and the output points, the balancing effect provided by copper backplane having a first side and a second side, the first side providing first power terminals and second power terminals through the backplane and the second side providing electrical traces disposing two pairs of MOSFETS each at a first proximity to either of the first power terminals or the second power terminals with a first effective resistance and the third pair of MOSFETS at a second proximity between the first power terminals and the second power terminals with a second effective resistance, wherein the first effective resistance is substantially the same as the second effective resistance; providing an AC/DC power source with a first flexible wire and a second flexible wire connected to the bi-directional input points; providing a rechargeable battery in electrical connection to the output points by a first conductive copper bar and a second conducive copper bar; providing a system controller in controlling communication with the AC/DC power source and each pair of MOSFET circuits, the system controller further having a first current and voltage sensor disposed in communication with at least one set of MOSFET circuits and a second current and voltage sensor structured and arranged to detect current and voltage in the rechargeable battery; providing an initial set of parameters for testing the rechargeable battery, including at least initial values for an ideal battery, the initial values permitting the system controller to determine initial PID values; initializing a current to the rechargeable battery with respect to the initial PID values while measuring at least current and voltage from the first sensor and current and voltage from the battery; and following an initial interval, adaptively utilizing the measurements from the first sensor and the battery to modify the initial PID values to modified PID control values, and refining the modified PID control values based on continuing measurements from the first sensor and the battery to test the rechargeable battery.

BRIEF DESCRIPTION OF THE DRAWINGS

FIG. 1A illustrates an exemplary digital battery testing system and more specifically the bi-directional DC/DC converter in accordance with at least one embodiment of the present invention;

FIG. 2 presents a top view of a printed circuit board (PCB) established on the copper backplane in accordance with at least one embodiment of the present invention;

DETAILED DESCRIPTION

Before proceeding with the detailed description, it is to be appreciated that the present teaching is by way of example only, not by limitation. The concepts herein are not limited to use or application with a specific system or method for a bi-directional DC/DC converter, or a high efficiency, rapid bi-directional DC/DC test cycler. Thus, although the instrumentalities described herein are for the convenience of explanation shown and described with respect to exemplary embodiments, it will be understood and appreciated that the principles herein may be applied equally in other types of systems and methods involving a bi-directional DC/DC converter.

As will be set forth below, the present invention advantageously utilizes geometry rather than additional devices to achieve a linear arrangement of converter stages without an imbalance of resistance by evening out the effective conductor lengths on at least one side of the converter, either the input or the output.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 first appears in FIG. 1.

Figure 1A:
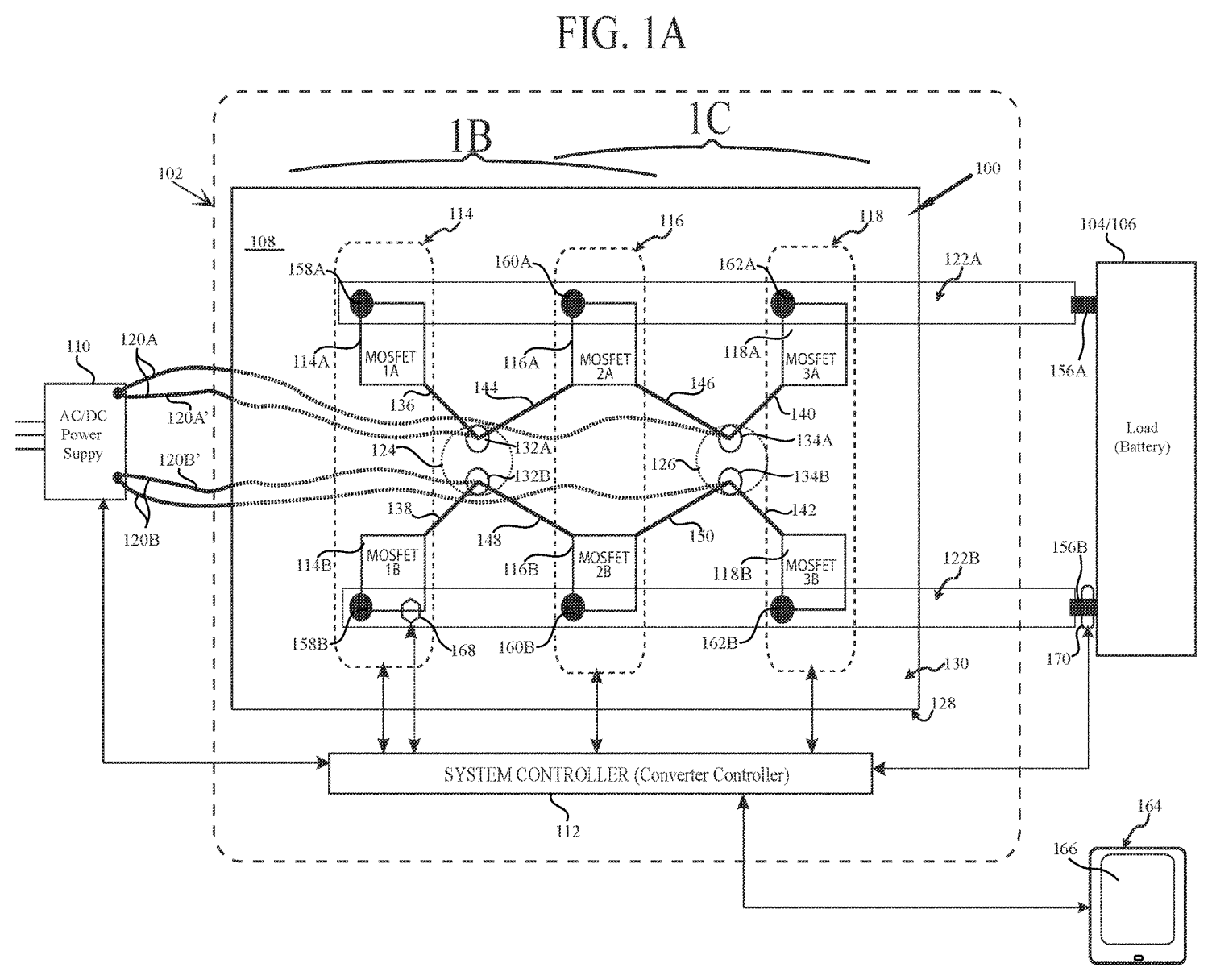
Figure 1B:
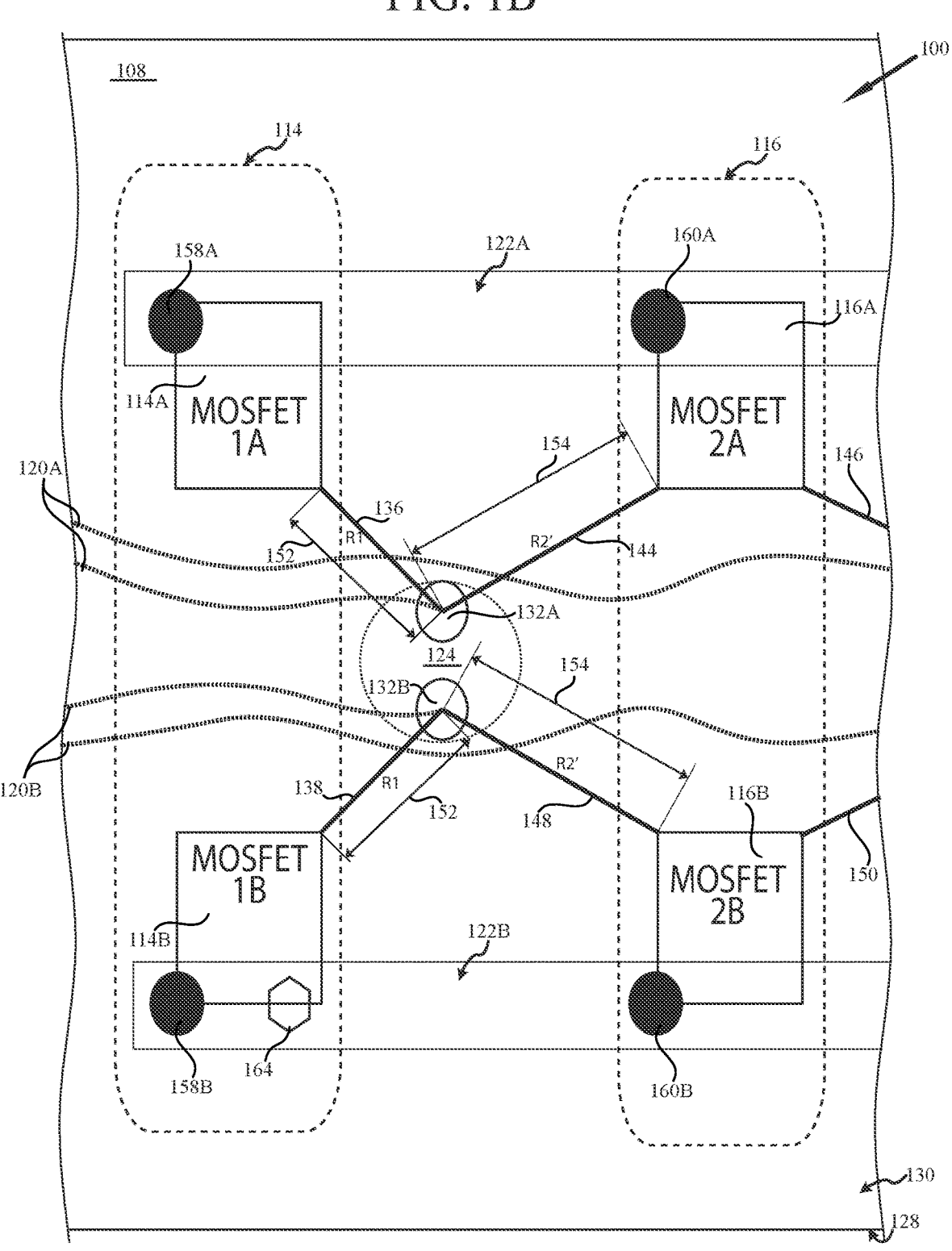
FIG. 1B illustrates a first enlarged section of the bi-directional DC/DC converter shown in FIG. 1A in accordance with at least one embodiment of the present invention.

Turning now to the figures, and most specifically FIGS. 1A, 1B and 1C there is shown a conceptual illustration of an exemplary bi-directional DC/DC converter 100, (hereinafter "BDC 100") in accordance with at least one embodiment, which for ease of illustration and discussion is shown as a component of a digital battery testing system 102. The system is referred to as being "digital" because of the speed of response and the digital nature of the control components. FIG. 1A presents an overview of a simplified conceptual illustration, with FIGS. 1B and 1C providing enlarged sections of the BDC 100, and FIG. 1D presenting a simplified illustration of just the BDC 100.

Moreover, for at least one embodiment the battery testing system 102 is configured for bi-directional charging and discharging of a load 104, such as a battery 106, and more specifically a battery 106 for an electric vehicle or hybrid electric vehicle in order to charge and/or test the battery 106.

As will be more fully appreciated from the following description, for at least one embodiment of the present invention, the battery testing system 102, and more specifically the BDC 100 is structured and arranged to provide three hundred (300) amps of current. Further still, the battery testing system, and more specifically the BDC 100 is structured and arranged to permit adjustment/change in the value of the current—up or down as well as direction—in less than 1 millisecond.

As is shown in FIG. 1A, presenting a simplified conceptual drawing, the BDC 100 of the battery testing system has a copper backplane 108, an AC/DC power source 110, a system controller 112, three paired sets of DC/DC converters 114, 116, 118 (first set of DC/DC converters 114A & 114B, second set of DC/DC converters 116A & 116B, and third set of DC/DC converters 118A & 118B), a set of first wires 120A and second wires 120B, and a set of conductive copper bars 122A and 122B.

As the BDC 100 is, as the name implies, capable of transferring power in either direction, use of labels such as "input" and "output" are not intended as limitations, but may help in differentiating various elements for the sake of ease of discussion and illustration.

More specifically, there are two sets of first wires 120A and second wires 120B which provide power from an AC/DC power source 110, which may in turn be electrically coupled to an AC power source, such as a three phase 480 Volt industrial electrical network (not shown). It will be understood and appreciated that the first wires 120A and the second wires 120B are substantially identical in terms of both length and material such that all have essentially the same resistance. It will also be appreciated that the first and second wires are flexible. For at least one embodiment the first and second wires are 2-AWG gage copper wires.

As the conceptual illustration of FIG. 1A is essentially 2-dimensional, although the first wires 120A and the second wires 120B are substantially the same length, wires 120A' and 120B' have been rendered short so as to avoid visual confusion by attempting to show looping, coiling or some other compaction to permit each wire to have the same visual length.

As may also be appreciated in FIG. 1A, the first wires 120A and second wires 120B each deliver electrical power to specific location points on the copper backplane 108—e.g., a first location 124 and a second location 126. It may also be appreciated that the copper backplane 108 has a first side 128 and a second side 130, the first location 124 and the second location 126 acting as first power terminal 132 and a second power terminal 134 through the copper backplane 108 from the first side 128 to the second side 130.

Moreover, it will be understood and appreciated that the first wires 120A and second wires 120B are connected to the bottom (e.g., the first side 128) of the copper backplane 108, with the three paired sets of DC/DC converters (first set of DC/DC converters 114A & 114B, second set of DC/DC converters 116A & 116B, and third set of DC/DC converters 118A & 118B) disposed upon the top (e.g., the second side 130) of the copper backplane 108.

More simply stated, the first wires 120A and second wires 120B are connected to one side of the copper backplane 108 with the three paired sets of DC/DC converters disposed on the other side of the copper backplane 108.

Although for at least one embodiment the first power terminal 132 is a single power terminal and the second power terminal 134 is a single terminal, for the embodiment shown as well as ease of illustration and discussion, first power terminal 132 and second power terminal 134 are each shown as two paired terminals. Moreover, a single electrical wire from the power source 110 may connect to a single first power terminal 132 on the first side 128 of the copper backplane 108, with two corresponding connection terminals presented on the second side 130 of the copper back plane 108, and a single electrical wire from the power source 110 may connect to a single second power terminal 134 on the first side 128 of the copper backplane 108, with two corresponding connection terminals presented on the second side 130 of the copper back plane 108.

It will be appreciated that first power terminal 132A and second power terminal 134A are associated with DC/DC converters 114A, 116A and 118A, while first power terminal 132B and second power terminal 134B are associated with DC/DC converters 114B, 116B and 118B.

It will also be appreciated the physical placement of the first power terminals 132A/B and the second power terminals 134A/B is quite deliberate and specific. Electrical traces, further discussed below, interconnect the first power terminals 132A/B and the second power terminals 134A/B with their associated DC/DC converters 114A/B, 116A/B and 118A/B. Though not shown, for at least one embodiment the copper backplane 108 is also coupled to a heatsink, which may also be the ground plane.

For at least one embodiment the DC/DC converters 114A/B, 116A/B and 118A/B. are switches, and more specifically are metal-oxide-semiconductor field-effect transistors (MOSFETs 1A, 1B, 2A, 2B, 3A, 3B). However, insulated gate bipolar transistors (IGBTs) or other switching devices known in the art may be used in alternative embodiments of the present invention.

As is shown in FIG. 1A, electrical trace 136 connects MOSFET 1A to first power terminal 132A, electrical trace 138 connects MOSFET 1B to first power terminal 132B, electrical trace 140 connects MOSFET 3A to second power terminal 134A, and electrical trace 142 connects MOSFET 3B to second power terminal 134B. In addition, electrical trace 144 connects MOSFET 2A to the first power terminal 132A and electrical trace 146 connects MOSFET 2A to the second power terminal 134A. Likewise, electrical trace 148 connects MOSFET 2B to first power terminal 132B and electrical trace 150 connects MOSFET 2B to the second power terminal 134B.

Figure 1C:
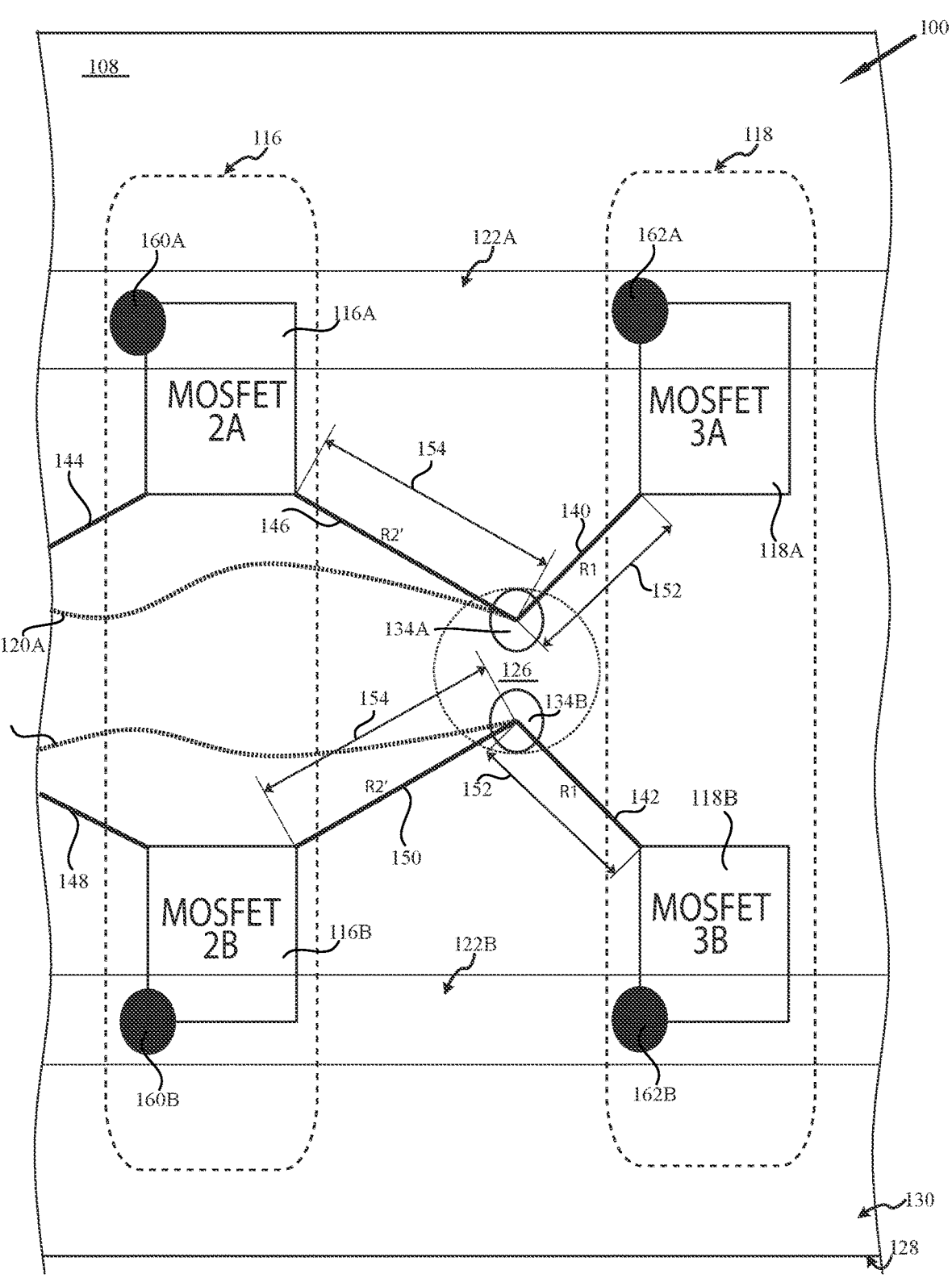
FIG. 1C illustrates a second enlarged section of the bi-directional DC/DC converter shown in FIG. 1A in accordance with at least one embodiment of the present invention.
Figure 1D:
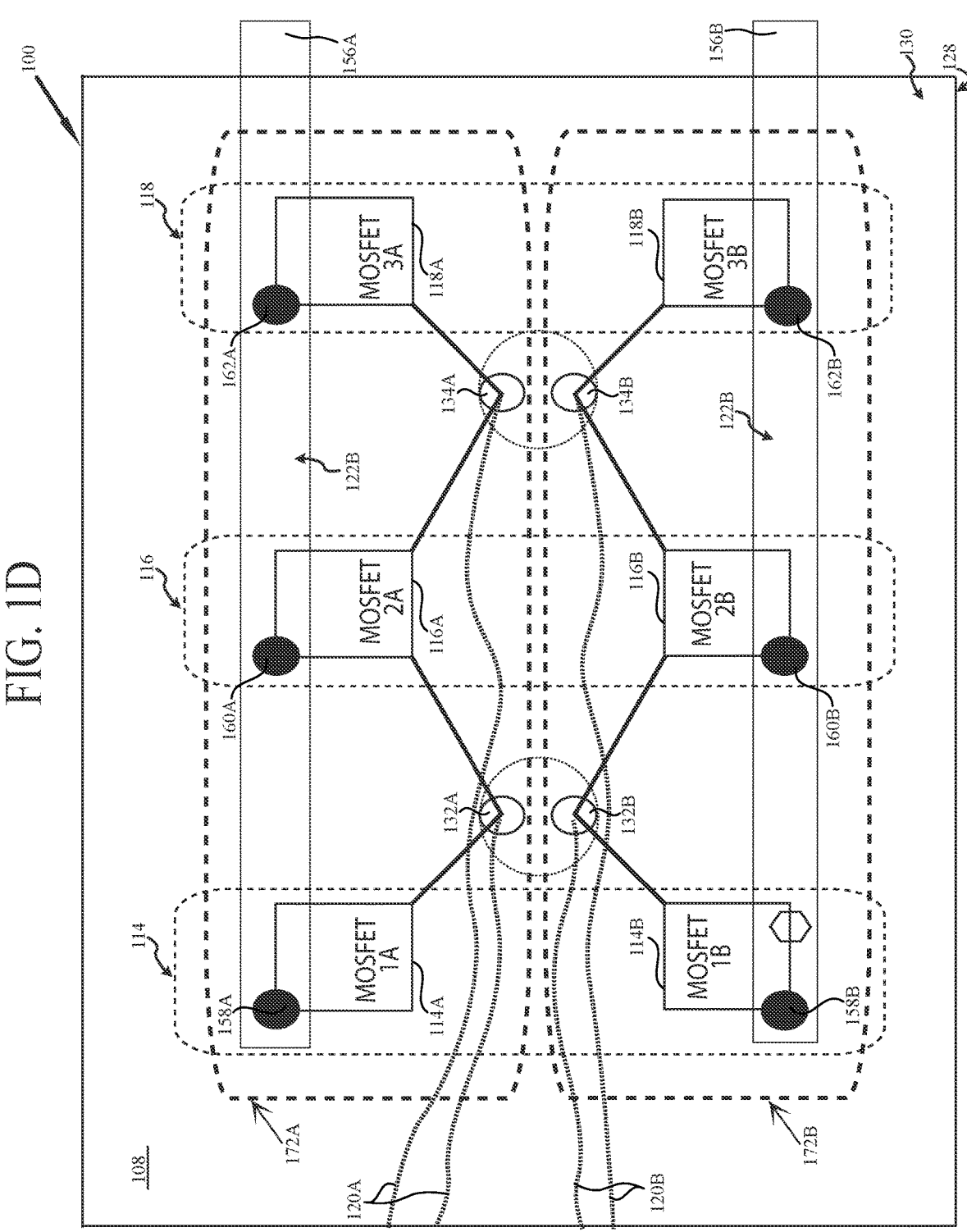
FIG. 1D illustrates an enlarged view of the bi-directional DC/DC converter shown in FIG. 1A in accordance with at least one embodiment of the present invention.

More specifically, and as may be more fully appreciated in partial enlargement sections of BDC 100 shown in FIGS. 1B and 1C, the first pair of MOSFET circuits (e.g., MOSFET 1A and MOSFET 1B), are disposed at a first proximity 152 to the first power terminal (e.g., first power terminal 132A and first power terminal 132B). As such, MOSFET 1A is in electrical communication with first power terminal 132A at first resistance (R1), and MOSFET 1B is in electrical communication with first power terminal 132B at the same first resistance (R1) (see FIG. 1B). As there is only one electrical trace between MOSFET 1A and first power terminal 132A, and similarly only one electrical trace between MOSFET 1B and first power terminal 132B, the first effective resistance for both MOSFET 1A and MOSFET 1B is simply R1.

Similarly, as may be appreciated in FIG. 1C, the third pair of MOSFET circuits (e.g., MOSFET 3A and MOSFET 3B), are disposed at essentially the same first proximity 152 to the second power terminal (e.g., second power terminal 134A and second power terminal 134B). As such, MOSFET 3A is in electrical communication with second power terminal 134A at the same first resistance R1, and MOSFET 3B is in electrical communication with second power terminal 134B at the same resistance R1. Again, the first effective resistance is simply R1.

Moreover, the first effective resistance for the flow of power between MOSFETS 1A, 1B 3A and 3B with respect to the first power terminals 132A/B and second power terminals 134A/B are all balanced and equal as first effective resistance R1.

As may be appreciated in both FIGS. 1B and 1C, the second pair of MOSFET circuits (e.g., MOSFET 2A and MOSFET 2B) are disposed at a second proximity 154 between the first power terminal and the second power terminals (e.g., first power terminals 132A/B and second power terminals 134A/B). It also be appreciated by visual inspection that the second proximity 154 is greater than the first proximity 152.

Returning to MOSFET 2A and MOSFET 2B, MOSFET 2A is in electrical communication through electrical trace 144 with first power terminal 132A and in electrical communication through electrical trace 146 with second power 134A. Because electrical traces 144 and 146 are longer than electrical traces 136, 138, 140 and 142, electrical traces 144 and 146 each have a greater resistance R2'. However, because there are two electrical traces and not one, there is a second effective resistance (R2).

Likewise, MOSFET 2B is in electrical communication through electrical trace 148 with first power terminal 132B and in electrical communication through electrical trace 150 with second power 134B. And again, because electrical traces 148 and 150 are longer than electrical traces 136, 138, 140 and 142, electrical traces 148 and 150 each have a greater resistance R2'. However, because there are two electrical traces and not one, there is again the same second effective resistance (R2).

Herein lies an important advantage of the present embodiment that is advantageously distinct. The effective second resistance R2 provided by both electrical traces 144 & 146 for MOSFET 2A and both electrical traces 148 & 150 for MOSFET 2B is the same as the first effective resistance R1 provided by the single traces 136, 138, 140 and 142 for MOSFETs 1A, 1B, 3A and 3B. In other words, the physical geometry of BDC 100 advantageously establishes that the effective resistance R1 provided by the single electrical traces is equal to the effective resistance R2 provided by the two electrical traces.

Moreover, the effective second resistance R2 as provided by the combined and electrical traces for the second pair of MOSFETs is essentially the same as the first effective resistance, e.g., R1=R2. Those skilled in the art will understand and appreciate that the equalization of R1 to R2 may also be due at least in part to the thickness and/or other properties of the electrical traces, however, given the physical size of the various electrical components disposed upon the copper backplane 108, the length of the electrical traces may be utilized effectively in this regard.

In other words, the input power points are balanced power points such that two power points (e.g., first power terminal 132A/132B and second power terminal 134A/134B) effectively and equally provide the same amount of power to each of the three MOSFET pairs. Accordingly, no MOSFET pair receives more power/current than any other.

Across the top of the pairs of MOSFETS is the first copper bar 122A and across the bottom pairs of MOSFETS is the second copper bar 122B, the first copper bar 122A providing output terminal 156A and the second copper bar 122B providing output terminal 156B. Moreover, it will be understood and appreciated that the first copper bar 122A is disposed in electrical contact with MOSFETs 1A, 2A and 3A through contacts 158A, 160A and 162A and the second copper bar 122B is disposed in electrical contact with MOSFETs 1B, 2B and 3B through contacts 158B, 160B and 162B.

These two copper bars 122A and 122B are utilized as the output terminals as copper bars are pre-selected with an appropriate size/gauge so as to have essentially no resistance between points. As such, the first copper bar 122A aggregates the output current from MOSFETs 1A, 2A and 3A and the second copper bar 122B aggregates the output current from the MOSFETs 2A, 2B, and 3B.

Of course, as the BDC 100 is indeed bi-directional, current may be received through the first copper bar 122A and second copper bar 122B and provided to the pairs of MOSFETs. However, the balanced placement of the first and second input points (e.g., first power terminal 132A/132B and second power terminal 134A/134B) relative to each set of three MOSFET pairs, ensures that the uniformity of balanced resistance and balanced power distribution remains advantageously consistent.

This balance of 2 to 3 (two inputs to three outputs, or three inputs to two outputs depending on the flow of power) is further shown in FIG. 1D showing balanced side A by dotted rectangle 172A and balanced side B by dotted rectangle 172B.

It is of course understood and appreciated that two copper bars may also be used for electrical connection between the AC/DC power source and the first input power points and second input power points. However, use of copper bars on both sides of the BDC 100 would significantly increase the weight and cost of the BDC 100 and overall battery tester.

It will also be understood and appreciated that as each pair of MOSFETs may be structured and arranged to convert 100 amps, at no place within the circuit boards of the BDC 100 are 300 amps being handled—it is advantageously only 100 amps at any given place. The aggregate total of 300 amps without actual handling of more than 100 amps at any given place is quite advantageous—permitting savings in cost, size and space, and on-board heat generated within the components.

It is also worth noting that the physical design of at least one embodiment of BDC 100 as shown and described, has yet another additional advantageous feature. The MOSFET gate traces may carry up to four amps of current with a short duration time of 0.1 microseconds. This may result in the emission of some electromagnetic radiation. However, the close proximity between the ground plane and the copper backplane advantageously results in a Faraday cage and creates a closed path to capture the radiation.

As noted above, the digital battery testing system 102 as shown in FIG. 1A, and more specifically the BDC 100 also includes a system controller 112, which may also be viewed as the BDC 100 controller. This system controller 112 is structured and arranged to control each of the three pairs of MOSFETs interleaving their function in time. Moreover, for each pair of MOSFETs, the controller ensures that their contribution to the total power is substantially the same such that they operate in balance.

For at least one embodiment, the system controller 112 may also control the AC/DC power source 110. In addition, the system controller 112 is also adapted for communication with a remote computing device 164 by cable or wireless connection. This remote computing device 164 will be understood and appreciated to include a memory that stores computer executable instructions for the control and operation of the digital battery testing system 102, and more specifically the BDC 100. The remote computing device 164 also provide at least one user interface 166, such as, but not limited to, a display screen, keyboard, touch pad, touch display, speaker, indicator lights, etc.

The user interface 166 permits a user to specify parameters for operating the digital battery testing system 102, and more specifically the BDC 100. For at least one embodiment, these operating parameters include, but are not exclusively limited to, positive current to charge, negative current to discharge, voltage amplitude, watt hours and duration.

As is also shown in FIG. 1, for at least one embodiment, system controller 112 of the BDC 100 is also in communication with a first sensor 168 that is connected between at least one MOSFET and a copper bar (first sensor 168 shown to be between MOSFET 1B and copper bar 122B). This first sensor 168 senses internal inductor current of the BCD 100, thus permitting the system controller 112 to sense the value of the DC/DC converter (e.g., at least one pair of MOSFETs) which is communicated as a feedback signal representative of the sensed value.

A second sensor 170, e.g., current sensor 170, may also be electrically coupled to at least one of the two copper bars proximate to the load 104 (current sensor 170 shown disposed with output terminal 160B of copper bar 122B proximate to the load 104). This second sensor 170 as a current sensor permits direct measurement of the load 104/batter 106 current.

Moreover, the system controller 112 receives the feedback signals generated by the either or both of the first sensor 168 and the second sensor 170 and generates a command signal to each pair of MOSFETs that adjusts their performance so as to adhere to the user specified parameters for operation.

Figure 2:
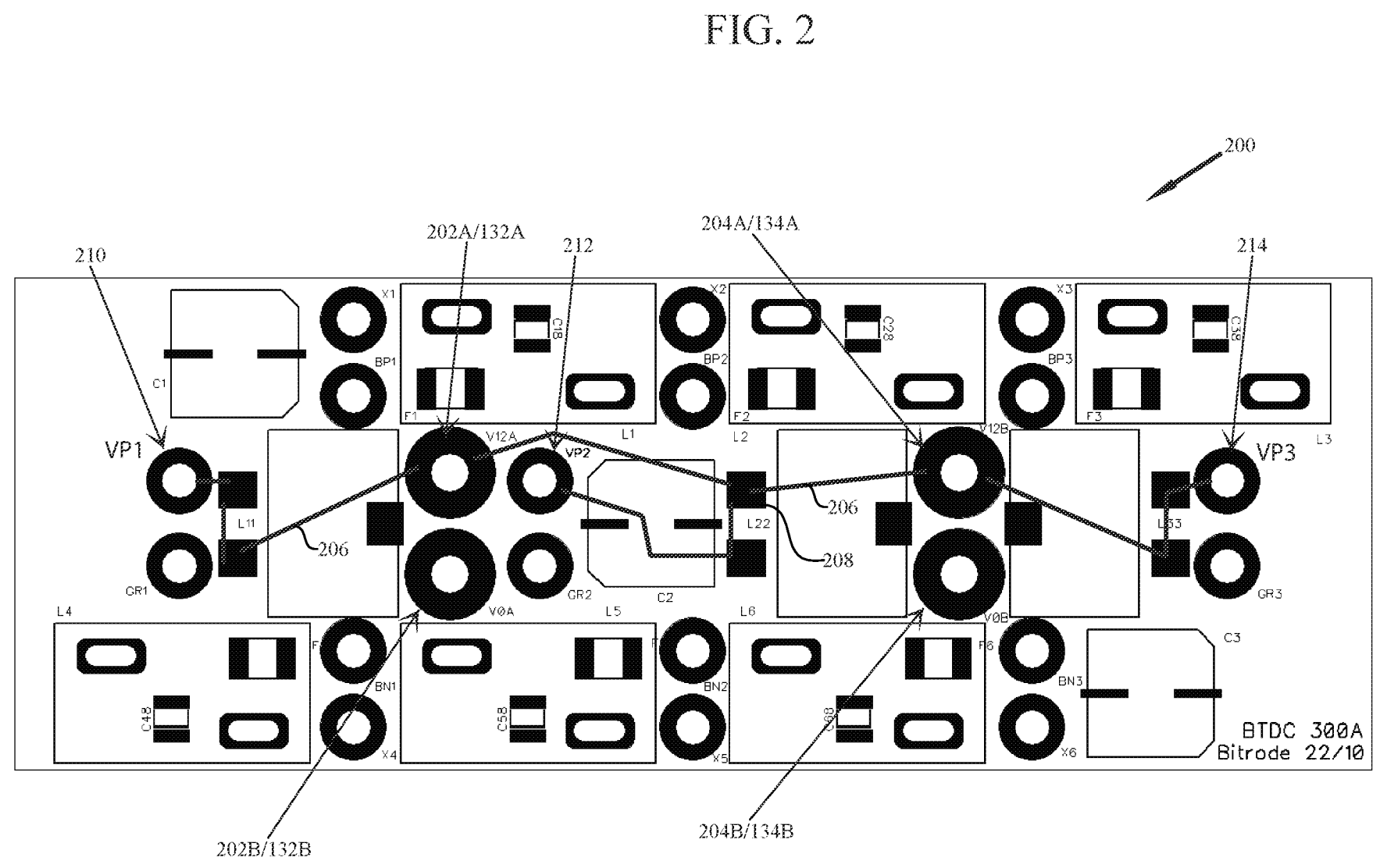

FIG. 2 presents a top view of an embodiment of a printed circuit board 200 (PCB 200) disposed upon the copper backplane 108. The four (4) large circles 202A 202B and 204A and 204B in the center are the input power terminals—the first power terminal 132A/132B and second power terminal 134A/134B. Black line traces 206 have been added to show the electrical traces which pass through inductors 208, shown as squares, to terminals VP1, VP2 and VP3 further identified as elements 210, 212 and 214 which in turn align to power MOSFETs 1A, 2A and 3A.

Figure 3:
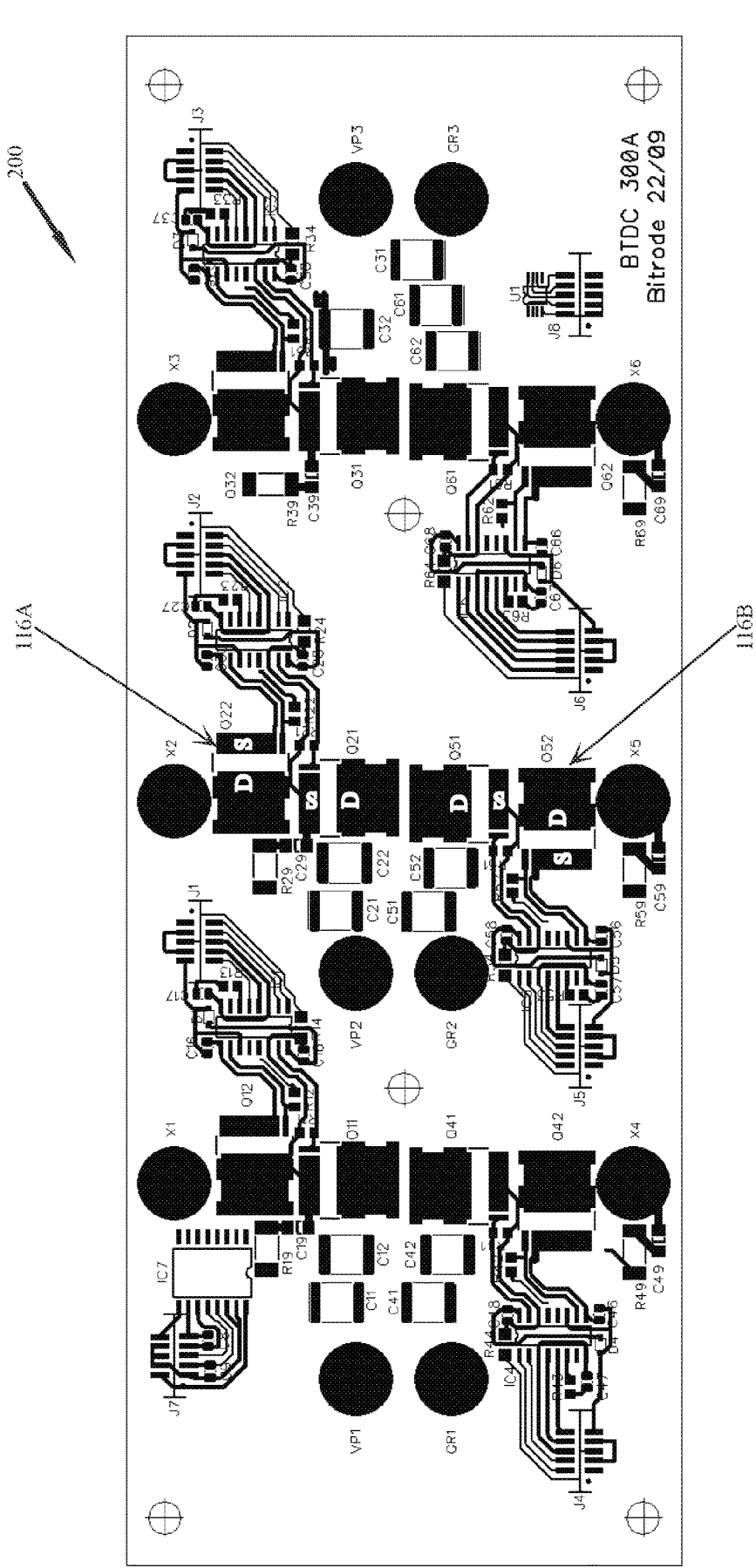
FIG. 3 presents a bottom view of the printed circuit board (PCB) shown in FIG. 2 in accordance with at least one embodiment of the present invention.

FIG. 3 presents a bottom view of the printed circuit board 200 (PCB 200) shown in FIG. 2. Annotations for the Source "S" and Drain "D" terminals for MOSFETs 2A (116A) and 2B (116B) have been added as well.

Figure 4:
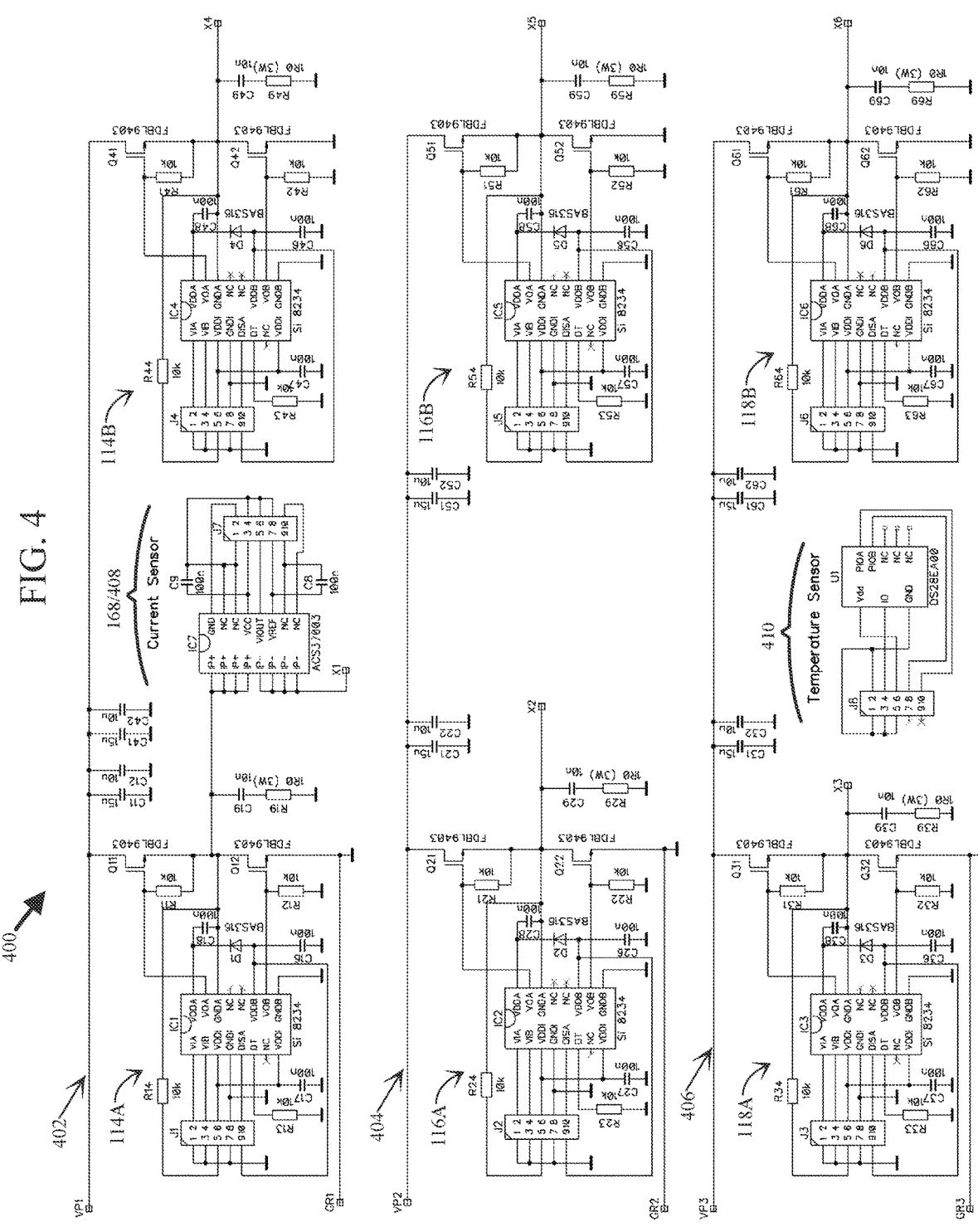
FIG. 4. presents an illustration of the circuit diagrams of the PCB shown in and 3 in accordance with at least one embodiment of the present invention.

FIG. 4 presents an illustration of the circuit diagrams 400 of the PCB 200 shown in FIGS. 2 and 3, in accordance with at least one embodiment. The top circuit 402 corresponds to MOSFETs 1A (114A) and 1B (114B), the middle circuit 404 corresponds to MOSFETs 2A (116A) and 2B (116B) and the bottom circuit 406 corresponds to MOSFETs 3A (118A) and 3B (118B).

Indeed, for the three balanced voltage inputs shown as VP1 presented to the first set of MOSFETs, 1A and 1B, VP2 presented to the second set of MOSFETs, 2A and 2B, and VP3 presented to the third set of MOSFETs 3A and 3B, it may be appreciated that the first set provides outputs X1 and X4, the second set provides X2 and X5 and the third set provides X3 and X6.

With respect to FIG. 4 the first sensor 168 (current sensor 168) conceptually in FIG. 1 and described above is now further illustrated as a circuit 408 incorporated as an element associated with the top circuit diagram regarding MOSFETs 1A and 1B. More specifically, this is a current sensor 168/408 for sensing the current I flowing from the first pair of MOSFETs 1A and 1B, and generating a feedback signal indicative of the sensed current I.

In addition, a temperature sensor circuit 410 is shown incorporated as an element of the bottom circuit 406, the temperature sensor 410 ensuring that the BDC 100 remains in operation at a proper temperature.

It is to be appreciated that the advantageous nature of the present invention is due at least in part to the BDC 100 being an interleaved converter. A standard (un-interleaved) converter traditionally uses two pairs of MOSFETs, a pair on the left and another on the right. The load is between the center points of the MOSFET pairs, so the schematic is often referred to as an H-bridge configuration. As the present invention presents a 3-interleaved set of paired MOSFETs, the converter does not have a center point with equal distance to each of the H's—but does achieve balanced transition from 2 power terminals to 3 by the advantageous geometry as discussed above.

Figure 5A:
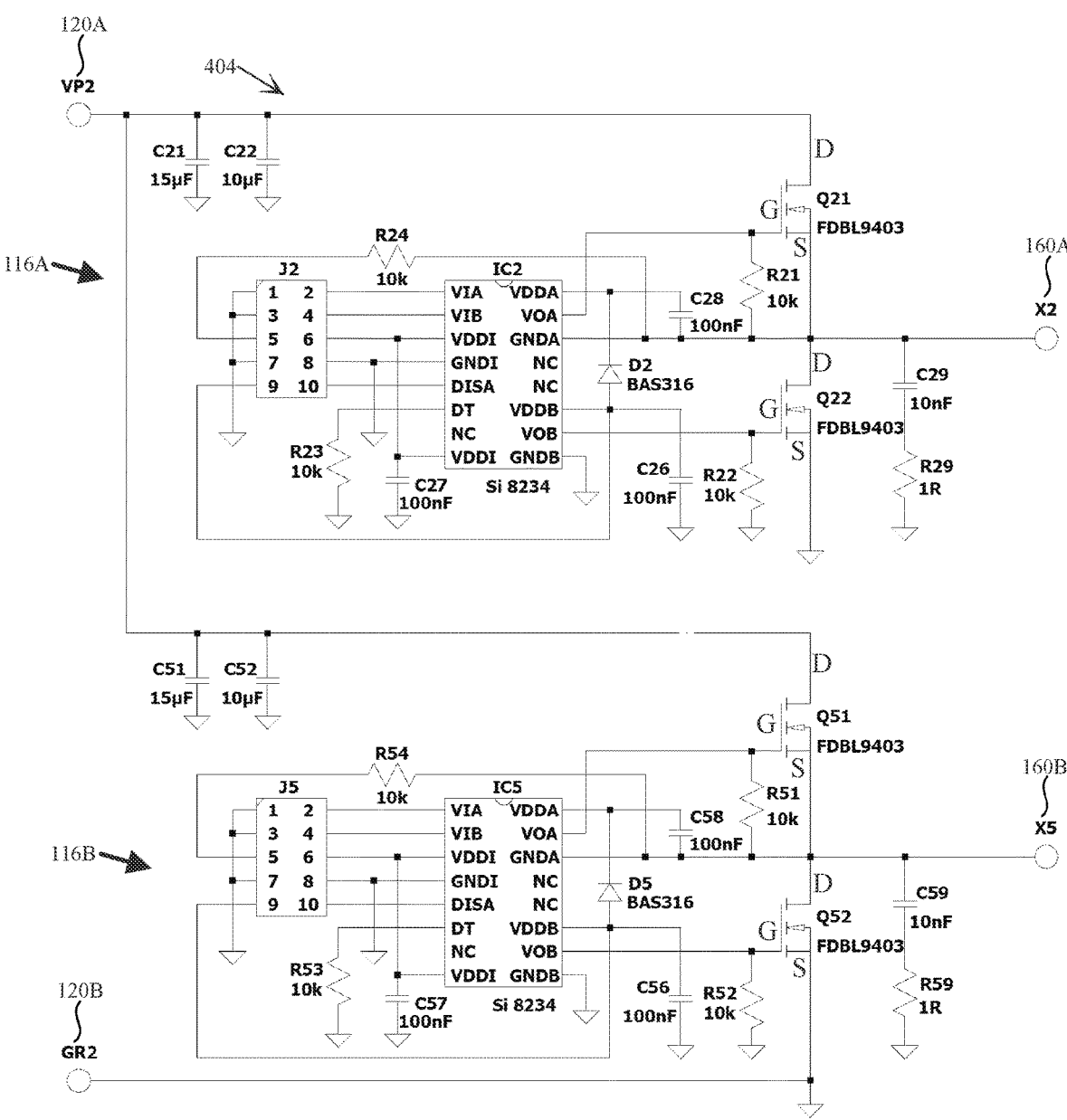
FIG. 5A is an enlarged view of the center circuit diagram shown in FIG. 4 in accordance with at least one embodiment of the present invention.

FIG. 5A is an enlarged view of the center circuit diagram 404 shown in FIG. 4, with further annotations identifying the Drain—"D", Gate—"G", and Source—"S" of each MOSFET 2A and 2B (116A and 116B). Moreover, each MOSFET pair has a low-Source, a top-Drain, a common-Source-Drain, and two Gates, the top-Drain of each MOSFET pair coupled to a first bi-directional input point such as the first wire (wire 120A).

The low-Source of each MOSFET pair is coupled to a second bi-directional input point such as the second wire (wire 120B). The common-Source-Drain of each MOSFET pair is coupled to either of the two bi-directional outputs such as contacts 160A and 160B which in turn connect to the first copper bar 122A or the second copper bar 122B. The Gates of each MOSFET pair coupled to a control circuit, e.g., the system controller 112. The control circuit directs control of the Gates of each MOSFET pair simultaneously.

Figure 5B:
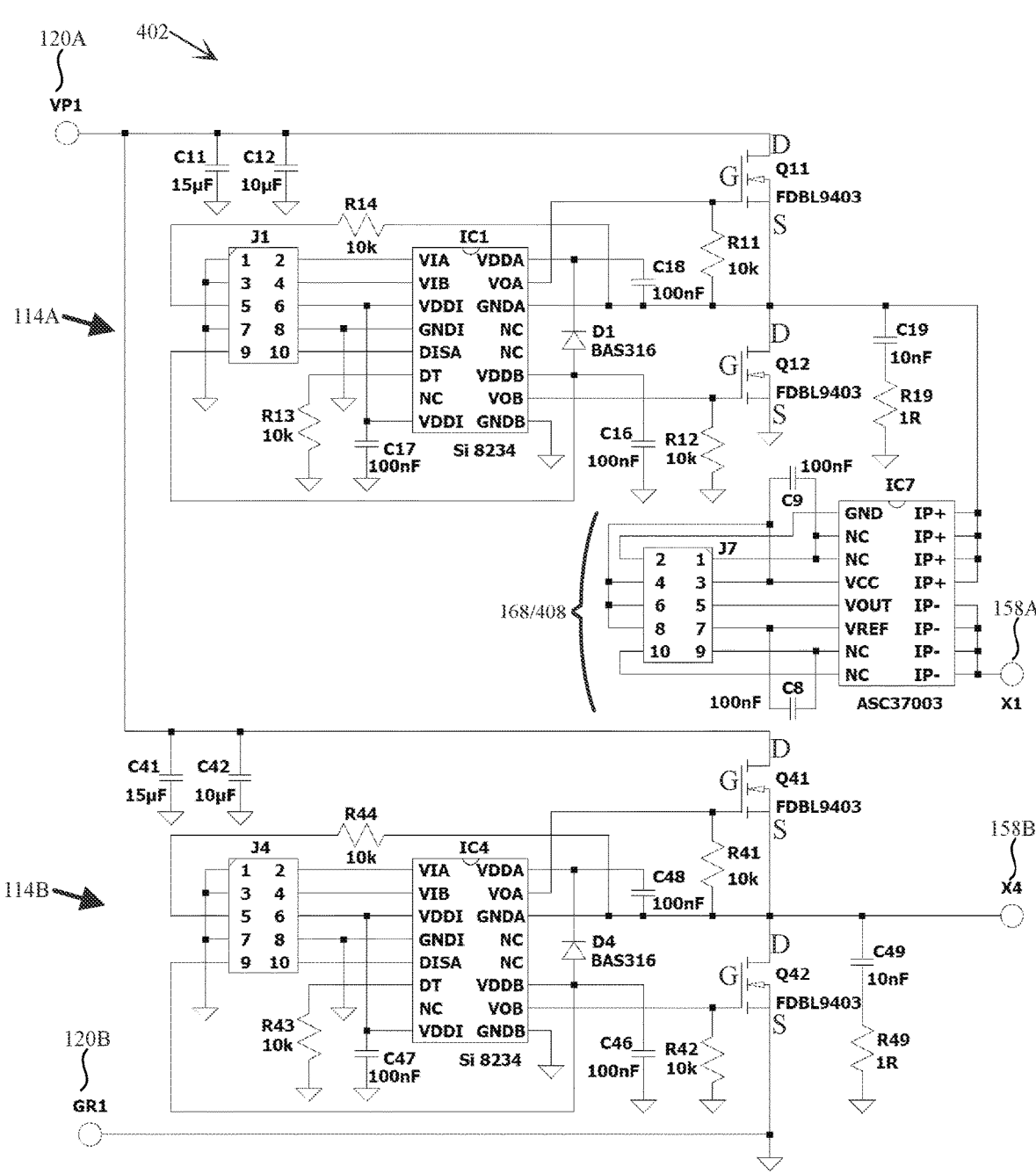
FIG. 5B is an enlarged view of the top circuit diagram shown in FIG. 4 in accordance with at least one embodiment of the present invention.
Figure 5C:
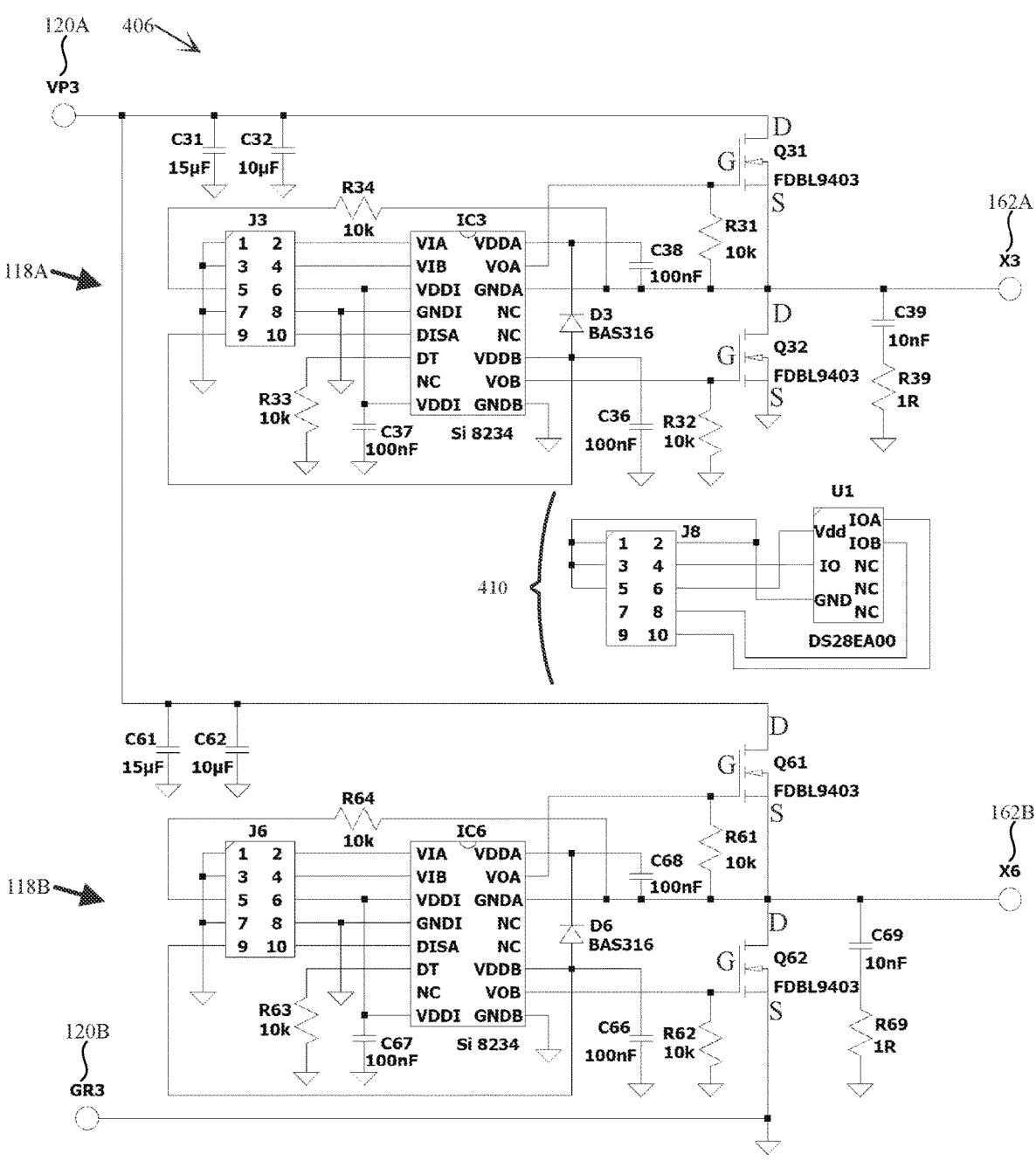
FIG. 5C is an enlarged view of the bottom circuit diagram shown in FIG. 4 in accordance with at least one embodiment of the present invention.

As with FIG. 5A, FIGS. 5B and 5C correspond to enlarged views of the top circuit diagram 402 and bottom circuit diagram 406 shown in FIG. 4, with further annotations identifying Drain—"D", Gate—"G", and Source—"S" of each MOSFET 1A and 1B (114A and 114B) in FIG. 5B, and MOSFET 3A and 3B (116A and 116B) in FIG. 5A.

Figure 6:
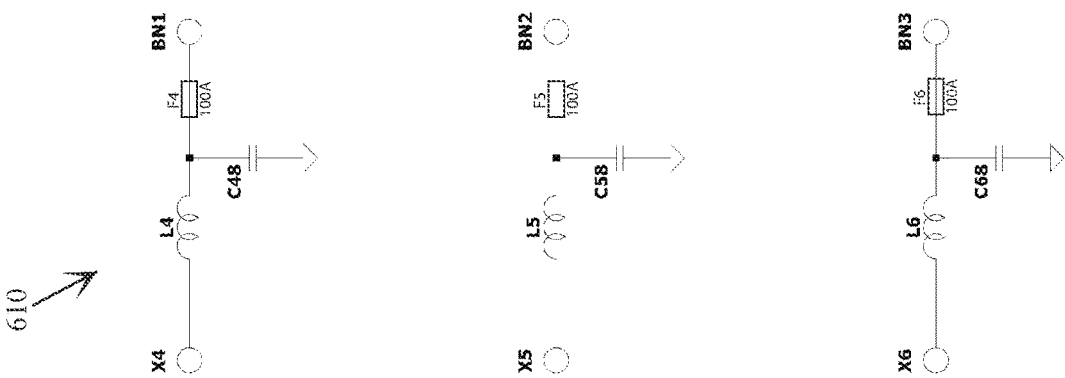
FIG. 6 presents an illustration of the circuit diagram for the upper passive PCB shown in FIG. 3 in accordance with at least one embodiment of the present invention.
Figure 6:
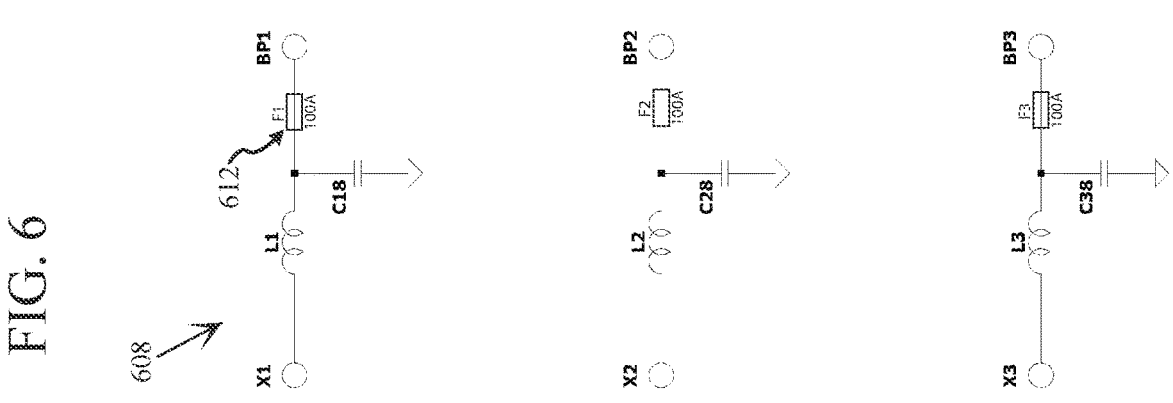
Figure 6:
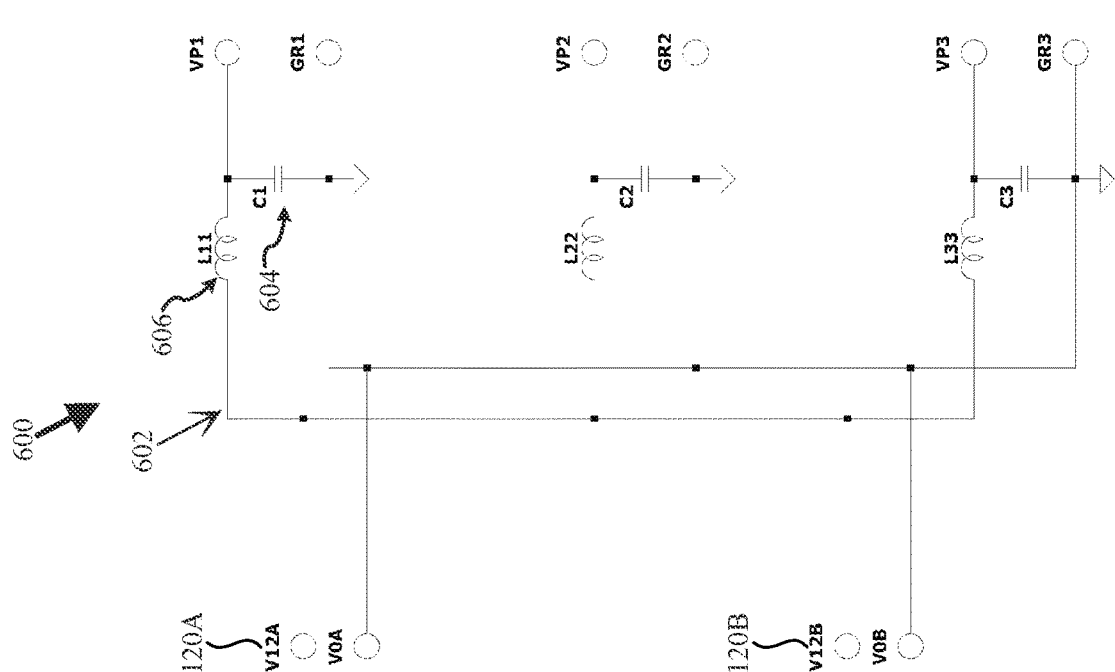

FIG. 6 presents an illustration of the circuit diagram for the upper passive PCB 600, corresponding to the PCB layout shown in FIG. 2. Circuit 602, shown on the left, shows the input terminals, with the balancing effect of two bi-directional input points (first wire 120A (V12A) and second wire 120B (V12B)) transitioning to three distinct power leads for the three pairs of MOSFETs. —VP1, VP2 and VP3 corresponding to the similarly labeled small posts shown in FIG. 2 and the inputs shown in FIG. 4.

Capacitors 604 and Inductors 606 are shown in this circuit so as to filter out high frequency signals and interference that may occur during operation of the digital battery testing system 102, and more specifically the BDC 100.

The middle circuit 608 and right circuit 610 correspond to the bi-directional outputs BP1, BP2 and BP3 coupling to the first copper bar 122A and BN1, BN2 and BN3 coupling to the second copper bar 122B. The middle circuit 608 will also be appreciated to show the inputs X1, X2 and X3 matching to the outputs of the MOSFETs 1A, 2A and 3A, and inputs X4, X5, X6 matching to the outputs of MOSFET 1B, 2B and 3B. It may be appreciated that the for at least one embodiment, fuses 612 are also shown so as to ensure that too much current is not inadvertently directed through the BDC 100.

With respect to the above description and the accompanying illustrations, it will be appreciated that the present invention is a linearly balanced test circuit, not the traditional radially balanced test circuit. It will also be appreciated, that for at least an embodiment providing 300 amps, the digital tester, and more specifically the BDC 100 is advantageously quite powerful, and very controllable.

With respect to testing a battery (load 104), and more specifically a battery for an electric vehicle, those skilled in the art will appreciate that it is traditional to apply a lot of current and observe the change in voltage. As current raises and voltage raises there is a time delay in the response from the battery. The system controller 112 utilizes at least the current sensor 170 to directly monitor the battery 105 being tested in slice-by-slice increments of time, measurable for at least one embodiment in fractions of a millisecond.

Figure 7:
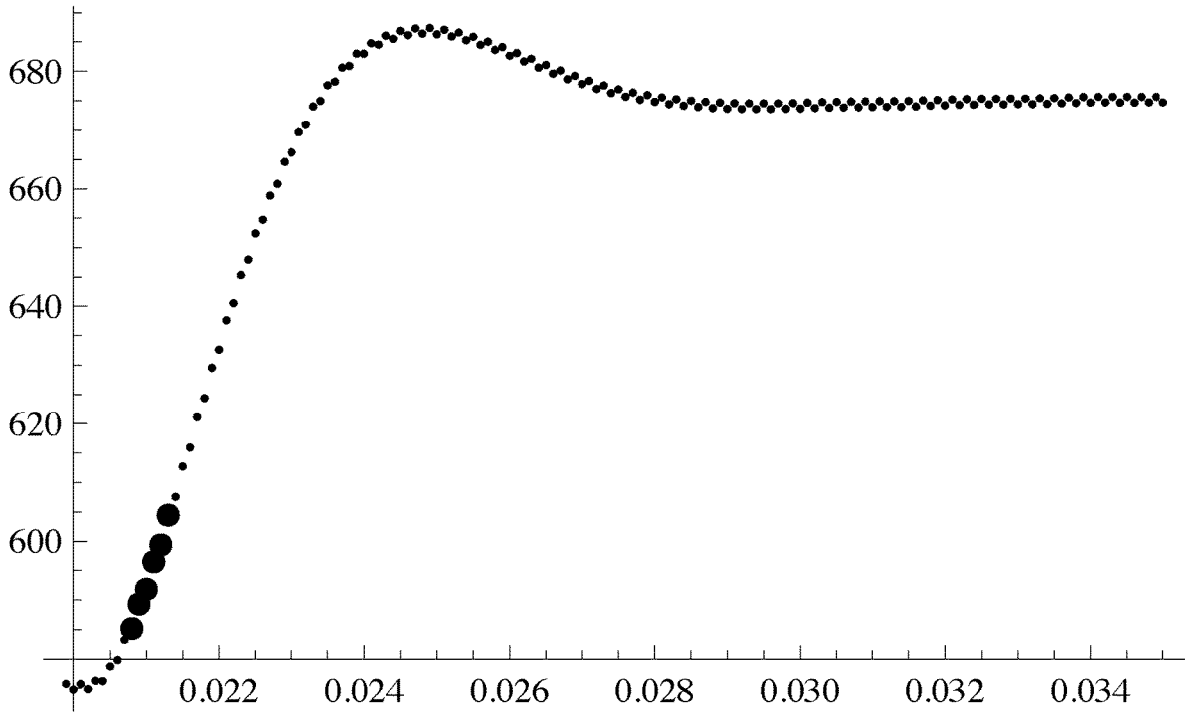
FIG. 7 is a graph of current response for a battery as tested by the digital battery testing system in accordance with at least one embodiment of the present invention.

Moreover, the initial process of testing starts with an initial application of current with monitoring of the response from at least the current sensor 162, which is internal to the BDC 100. For at least one embodiment the first few measurements are discarded. For at least one embodiment, the processing of measurements commences with the $4^{th}$ measurement, as shown in FIG. 7 presenting a graph of Current Response with measurements points used for battery estimation (vertical: amps, horizontal: seconds).

With respect to the provided test parameters, the system controller 112 then advantageously adjusts the controlled ramp-up of current very quickly and precisely.

For at least one embodiment, the digital battery tester 102, and more specifically the system controller of the BDC 100 controls the testing/charging/discharging of the battery with respect to at least three variables. The first is the PID control based on a single variable such as the computed difference between the target output current for the BDC 100 and the sensed current value.

The second variable is the output voltage, which is the voltage across the battery. The third variable is the current through the output inductor internal to the DC/DC converter. The second and the third variable allow for compensating the characteristics of the DC/DC converter. The first variable is the actual control variable of the PID system.

Collecting three variables allows for auto-tuning the PID parameters to optimize speed and quality of control. For example, the battery internal resistance Rsoc and battery internal state-of-charge voltage Vsoc is calculated from the measured samples. Likewise, the converter's dynamics is found by calculating the system pole, which is a figure of merit needed to properly shape current step transition. The pole is a set of two numbers, REAL and IMAG referred to as "the real part" and "the imaginary part".

Those skilled in the art will appreciate PID as Proportional-Integral-Derivative, a control loop mechanism that employs feedback—continuously calculating an error value as the difference between a desired set point and a measured process variable (e.g., the target current and the detected current) and applies a correction based on proportional, integral and derivative terms.

The initial PID value is based on an ideal battery, and of course different physical batteries may correlate to different ideal batteries. And adjustment to the PID through the traditional feedback process can and does have merit. However, as each battery is indeed unique, it is an advantage of the present invention to start with a PID based on ideal values, but to then adjust to values as actually determined from the battery being tested.

Moreover, in addition to the PID, for at least one embodiment additional measurements of the voltage in the battery and the voltage on the internal capacitor of the power stage and the current through the internal choke of the power stage are also sensed. Based on these additional measurements, the system controller advantageously compensates/modifies the PID control value—this modified PID value being the actual control value.

It will be appreciated that advantageous of the modified PID is an adaptive element. As powerup will invariably cause some random value even with ideal battery values, as stated above the first few measurements of current are discarded, but then as the measurements are evaluated and error values determined, the system controller develops a historical record.

The digital tester collects measurements from the voltage on the near side of the cable and the battery voltage on the far side of the cable. A set of chokes (inductors L11, L22, L33) provides power to the MOSFETs and another set of chokes (inductors L1 through L6) provides power from the MOSFETs to the battery, while capacitors (C1, C2, C3, and C18, C28, C38, C48, C58, C68) help in a filtering the power by eliminating ripple.

For at least one embodiment, measurements are collected from the choke L11 every 100 microseconds. Measurements are also collected from the battery, but typically at a slower pace. After the initial 4 to 5 measurements are discarded, the measured values replace the initial values in determining the PID. With the historical values, the system controller performs integration and derivative processing on the two sets of measurements—set A as measurements from the BDC 100 and set B as measurements from the battery. These values advantageously permit the determination of the modified PID control value and far more precise testing and evaluation of the battery being tested.

Changes may be made in the above methods, systems and structures without departing from the scope hereof. It should thus be noted that the matter contained in the above description and/or shown in the accompanying drawings should be interpreted as illustrative and not in a limiting sense. Indeed, many other embodiments are feasible and possible, as will be evident to one of ordinary skill in the art. The claims that follow are not limited by or to the embodiments discussed herein, but are limited solely by their terms and the Doctrine of Equivalents.

What is claimed:

1. A bi-directional DC/DC converter, comprising:
   a balancing effect of two bi-directional input points and two bi-directional output points to three distinct pairs of MOSFET circuits disposed between the input points and the output points, the balancing effect provided by a copper backplane having a first side and a second side, the first side providing first power terminals and second power terminals through the backplane and the second side providing electrical traces disposing two pairs of MOSFETS each at a first proximity to either of the first power terminals or the second power terminals with a first effective resistance and the third pair of MOSFETS at a second proximity between the first power terminals and the second power terminals with a second effective resistance, wherein the first effective resistance is substantially the same as the second effective resistance.

2. The bi-directional DC/DC converter of claim 1, wherein:

a first pair of MOSFET circuits is disposed at the first proximity to the first power terminal to provide electrical connectivity with the first power terminal at the first effective resistance;

a third pair of MOSFET circuits is disposed at the same first proximity to the second power terminal to provide electrical connectivity with the second power terminal at the first effective resistance; and a second pair of MOSFET circuits is disposed at a second proximity between the first power terminal and the second power terminal to provide electrical connectivity with the first power terminal and the second power terminal at a second effective resistance, wherein the first effective resistance of the first proximity is substantially the same as the second effective resistance.

3. The bi-directional DC/DC converter of claim 1, wherein the bi-directional input points provide a high voltage and low current in or out of the convert, the three pairs of MOSFET circuits bi-directionally converting the high voltage and low current in or out as provided by the bi-directional input points to a low voltage and high current in the two bi-directional outputs.

4. The bi-directional DC/DC converter of claim 1, wherein a first flexible wire and a second flexible wire are connected to the bi-directional input points.

5. The bi-directional DC/DC converter of claim 1, wherein the first wire and the second wire each have a length that is the same.

6. The bi-directional DC/DC converter of claim 1, wherein a first conductive bar and a second conductive bar are the bi-directional output points.

7. The bi-directional DC/DC converter of claim 6, wherein the first conductive bar and the second conducive bar are pre-selected to normalize the low voltage and high current provided by three pairs of MOSFET circuits.

8. The bi-directional DC/DC converter of claim 1, wherein each pair of MOSFET circuits is structured and arranged to support 100 amps of current.

9. The bi-directional DC/DC converter of claim 8, wherein the three pairs of MOSFET circuits permits 300 amps of current through the first conductive bar and the second conducive bar.

10. The bi-directional DC/DC converter of claim 1, wherein the pairs of MOSFET circuits are structured and arranged as a 3-interleaved converter for the bi-directional conversion of high voltage and low current at the bi-directional input points to low voltage and high current at the bi-directional output points.

11. The bi-directional DC/DC converter of claim 1, wherein the bi-directional DC/DC converter is further coupled to a computing device having a user interface, the user interface permitting a user to provide parameters for operating the converter.

12. The bi-directional DC/DC converter of claim 11, wherein the parameters for operating the converter are selected from the group consisting of: positive current to charge, negative current to discharge, current amplitude, watt hours, and duration.

13. The bi-directional DC/DC converter of claim 1, wherein each MOSFET pair has a low-Source, a top-Drain, a common-Source-Drain, and two Gates, the top-Drain of each MOSFET pair coupled to a first bi-directional input point, the low-Source of each MOSFET pair coupled to a second bi-directional input point, the common-Source-Drain of each MOSFET pair coupled to either of the two bi-directional outputs, the Gates of each MOSFET pair coupled to a control circuit.

14. The bi-directional DC/DC converter of claim 13, wherein the control circuit directs control of the Gates of each MOSFET pair simultaneously.

15. A bi-directional DC/DC converter, comprising:

a copper backplane having a first side and a second side;

a first wire connected to a first location on the first side of the backplane, and a second wire connected to a second location on the first side of the backplane, the first location and the second location acting as a first power terminal and a second power terminal through the backplane from the first to the second side;

three pairs of MOSFET circuits disposed on the second side of the backplane;

a first pair of MOSFET circuits disposed at a first proximity to the first power terminal to provide electrical connectivity with the first power terminal at a first effective resistance;

a third pair of MOSFET circuits disposed at the same first proximity to the second power terminal to provide electrical connectivity with the second power terminal at the first effective resistance;

a second pair of MOSFET circuits disposed at a second proximity between the first power terminal and the second power terminal to provide electrical connectivity with the first power terminal and the second power terminal at a second effective resistance, wherein the first effective resistance of the first proximity is substantially the same as the second effective resistance;

a first conductive bar electrically coupled across a first half of the pairs of MOSFET circuits and a second conductive bar electrically coupled across a second half of the pairs of MOSFET circuits;

wherein the first wire and second wire provide a high voltage and low current in or out of bi-directional DC/DC converter, the three pairs of MOSFET circuits bi-directionally converting the high voltage and low current in or out as provided by the first wire and second wire to a low voltage and high current in the first conductive bar and the second conductive bar.

16. The bi-directional DC/DC converter of claim 15, wherein the first conductive bar and the second conducive bar are pre-selected to normalize the low voltage and high current provided by three pairs of MOSFET circuits.

17. The bi-directional DC/DC converter of claim 15, wherein the pairs of MOSFET circuits are structured and arranged as a 3-interleaved converter for the bi-directional conversion of high voltage and low current at the bi-directional input points to low voltage and high current at the bi-directional output points.

18. The bi-directional DC/DC converter of claim 15, wherein each pair of MOSFET circuits is structured and arranged to support 100 amps of current.

19. The bi-directional DC/DC converter of claim 18, wherein the three pairs of MOSFET circuits permits 300 amps of current through the first conductive bar and the second conducive bar.

20. The bi-directional DC/DC converter of claim 15, wherein the first wire and the second wire are flexible wires each having a length that is the same.

21. The bi-directional DC/DC converter of claim 15, wherein the three pairs of MOSFET circuits are arranged as a linearly balanced circuit.

22. The bi-directional DC/DC converter of claim 15, wherein the first power terminal and the second power terminal are balanced power terminals, effectively providing the same flow of power to each pair of MOSFET circuits.

23. The bi-directional DC/DC converter of claim 15, wherein the value of the current flowing between the first wire and the second wire and the first conductive bar and the second conductive bar can be changed in under about 1 millisecond.

24. The bi-directional DC/DC converter of claim 15, wherein each MOSFET pair has a low-Source, a top-Drain, a common-Source-Drain, and two Gates, the top-Drain of each MOSFET pair coupled to the first wire, the low-Source of each MOSFET pair coupled to the second wire, the common-Source-Drain of each MOSFET pair coupled to either the first conductive bar or the second conductive bar, the Gates of each MOSFET pair coupled to a control circuit.

25. The bi-directional DC/DC converter of claim 15, wherein the bi-directional DC/DC converter is further coupled to a computing device having a user interface, the user interface permitting a user to provide parameters for using the bi-directional DC/DC converter.

26. The bi-directional DC/DC converter of claim 25, wherein the parameters for using the bi-directional DC/DC converter are selected from the group consisting of: positive current to charge, negative current to discharge, current amplitude, watt hours, and duration.

27. The bi-directional DC/DC converter of claim 15, wherein the backplane is coupled to a heatsink.

28. A method of providing a bi-directional DC/DC converter, comprising:

providing a bi-directional DC/DC converter including:

a balancing effect of two bi-directional input points and two bi-directional output points to three distinct pairs of MOSFET circuits disposed between the input points and the output points, the balancing effect provided by a copper backplane having a first side and a second side, the first side providing first power terminals and second power terminals through the backplane the second side providing electrical traces disposing two pairs of MOSFETS each at a first proximity to either of the first power terminals or the second power terminals with a first effective resistance and the third pair of MOSFETS at a second proximity between the first power terminals and the second power terminals with a second effective resistance, wherein the first effective resistance is substantially the same as the second effective resistance;

providing an AC/DC power source with a first flexible wire and a second flexible wire connected to the bi-directional input points;

providing a rechargeable battery in electrical connection to the output points by a first conductive copper bar and a second conducive copper bar;

providing a system controller in controlling communication with the AC/DC power source and each pair of MOSFET circuits, the system controller further having a first current and voltage sensor disposed in communication with at least one set of MOSFET circuits and a second current and voltage sensor structured and arranged to detect current and voltage in the rechargeable battery;

providing an initial set of parameters for testing the rechargeable battery, including at least initial values for an ideal battery, the initial values permitting the system controller to determine an initial PID values; initializing a current to the rechargeable battery with respect to the initial PID values while measuring at least current and voltage from the first sensor and current and voltage from the battery; and following an initial interval, adaptively utilizing the measurements from the first sensor and the battery to modify the initial PID values to modified PID control values, and refining the modified PID control values based on continuing measurements from the first sensor and the battery to test the rechargeable battery.

29. The method of claim 28, wherein:

a first pair of MOSFET circuits is disposed at the first proximity to the first power terminal to provide electrical connectivity with the first power terminal at the first effective resistance;

a third pair of MOSFET circuits is disposed at the same first proximity to the second power terminal to provide electrical connectivity with the second power terminal at the first effective resistance; and a second pair of MOSFET circuits is disposed at a second proximity between the first power terminal and the second power terminal to provide electrical connectivity with the first power terminal and the second power terminal at a second effective resistance, wherein the first effective resistance of the first proximity is substantially the same as the second effective resistance.

30. The method of claim 28, wherein the bi-directional input points provide a high voltage and low current in or out of the convert, the three pairs of MOSFET circuits bi-directionally converting the high voltage and low current in or out as provided by the bi-directional input points to a low voltage and high current in the two bi-directional outputs.

31. The method of claim 28, wherein a first flexible wire and a second flexible wire are connected to the bi-directional input points.

32. The method of claim 28, wherein the first wire and the second wire each have a length that is the same.

33. The method of claim 28, wherein a first conductive bar and a second conductive bar are the bi-directional output points.

34. The method of claim 33, wherein the first conductive bar and the second conducive bar are pre-selected to normalize the low voltage and high current provided by three pairs of MOSFET circuits.

35. The method of claim 28, wherein each pair of MOSFET circuits is structured and arranged to support 100 amps of current.

36. The method of claim 35, wherein the three pairs of MOSFET circuits permits 300 amps of current through the first conductive bar and the second conducive bar.

37. The method of claim 28, wherein the pairs of MOSFET circuits are structured and arranged as a 3-interleaved converter for the bi-directional conversion of high voltage and low current at the bi-directional input points to low voltage and high current at the bi-directional output points.

38. The method of claim 28, wherein the bi-directional DC/DC converter is further coupled to a computing device having a user interface, the user interface permitting a user to provide parameters for operating the converter.

39. The method of claim 38, wherein the parameters for operating the converter are selected from the group consisting of: positive current to charge, negative current to discharge, current amplitude, watt hours, and duration.

40. The method of claim 28, wherein each MOSFET pair has a low-Source, a top-Drain, a common-Source-Drain, and two Gates, the top-Drain of each MOSFET pair coupled to a first bi-directional input point, the low-Source of each MOSFET pair coupled to a second bi-directional input point, the common-Source-Drain of each MOSFET pair coupled to either of the two bi-directional outputs, the Gates of each MOSFET pair coupled to a control circuit.

41. The method of claim 40, wherein the control circuit directs control of the Gates of each MOSFET pair simultaneously.

* * * * *